United States Patent

[11] 3,591,926

[72] Inventor James R. Trice, Jr.
 Arlington County, Va.
[21] Appl. No. 704,024
[22] Filed Feb. 8, 1968
[45] Patented July 13, 1971
[73] Assignee Contractors Automated Devices, Incorporated
 Arlington, Va.

[54] LIGHT BEAM ALIGNING METHOD AND APPARATUS
 16 Claims, 6 Drawing Figs.
[52] U.S. Cl. ..................................... 33/46, 33/1
[51] Int. Cl. ..................................... G01c 15/00, G01c 1/00
[50] Field of Search ........................... 33/1 H, 46

[56] References Cited
 UNITED STATES PATENTS
 1,130,926  3/1915  Peck ....................... 33/1 (H)
 1,448,931  3/1923  Manning .................. 33/46 X
 3,116,557  1/1964  Trice, Jr. ................. 33/46
 3,130,495  4/1964  Schulte .................... 33/1 (H)
 3,136,062  6/1964  Garwood .................. 33/46
 FOREIGN PATENTS
 258,622   5/1949  Switzerland ............... 33/46

OTHER REFERENCES
E. H. Koenig: " Today' s Technics For Industrial Measurements" TOOLING & PRODUCTION Vol. 31, No. 5 (August 1965) pp. 72— 76 Copy in Group 280 33-46

*Primary Examiner*—Robert B. Hull
*Attorney*—Price, Heneveld, Huizenga & Cooper

ABSTRACT: This disclosure relates to an apparatus and method of aligning articles and obtaining their subgrade such as sewer pipes in a straight line and at a particular grade. The apparatus comprises a sighting means supporting apparatus which is attachable to a support means across a ditch such as a batter board and which positions the sighting means over the central portion of a manhole. The sighting means supporting apparatus has a measuring means and a vertical aligning means to position a light source a predetermined distance directly below the sighting means. The apparatus further comprises a collimated light source, preferably a laser beam, in a housing which contains a light source alignment means. A supporting structure for the light source is provided, which supporting structure has an adjustable means used in supporting the structure in the inside of a manhole or large pipe whether horizontal or vertical. The supporting structure also contains a two-point means for roughly and finely adjusting the horizontal and vertical position of the light source. Means are also provided for setting the grade or dip of the light source when the light source is properly aligned in the proper vertical plane at the proper depth.

PATENTED JUL 13 1971
3,591,926
SHEET 1 OF 2
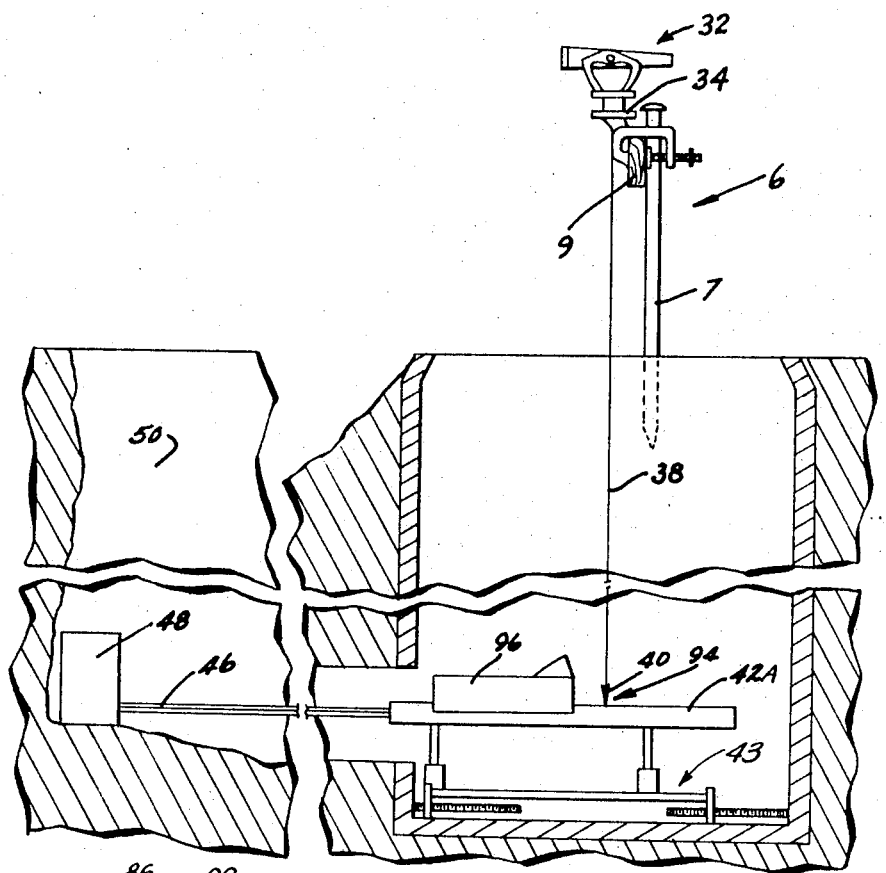
FIG. 1.
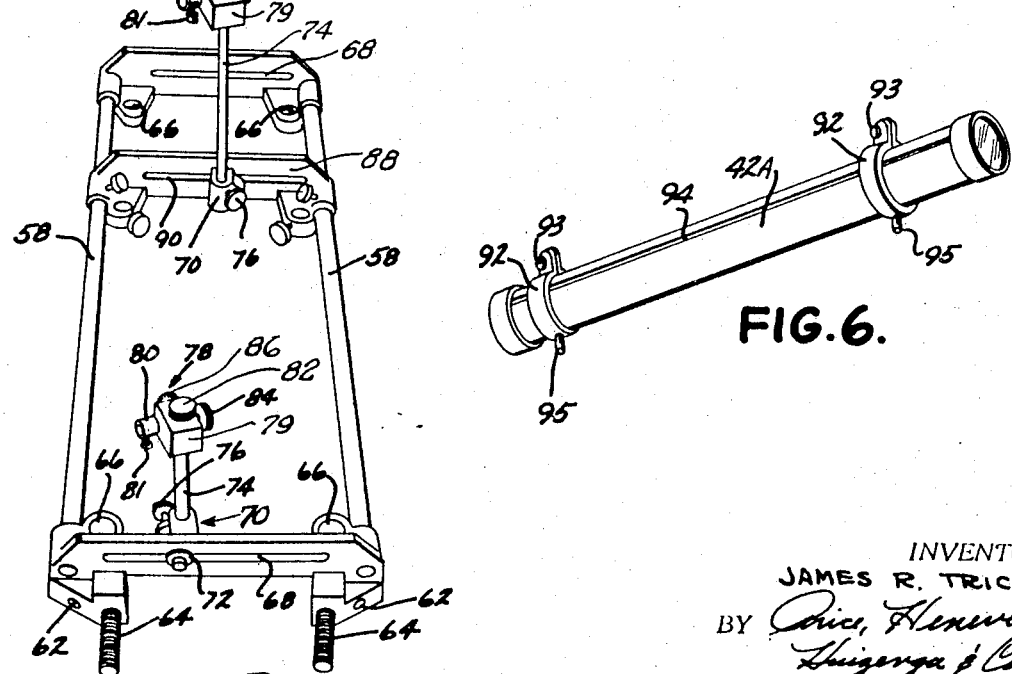
FIG. 5.
FIG. 6.
INVENTOR.
JAMES R. TRICE JR.
BY
ATTORNEYS

INVENTOR.
JAMES R. TRICE JR.

BY *Price, Heneveld,*
*Huizenga & Cooper*

ATTORNEYS

LIGHT BEAM ALIGNING METHOD AND APPARATUS

This invention relates to an apparatus for aligning sewer pipes comprising the combination of a sighting means supporting apparatus and a vertical alignment and positioning means; a light source; a light-source-supporting apparatus having a two-point adjustable means for the light source; and a means for attaching the supporting apparatus to the inside of a manhole or sewer pipe.

In another of its aspects, the invention relates to a method for aligning a light beam along a predetermined subterranean path from a vertical hole in the ground intersecting the path and in which a ditch has been provided generally along the path, the method comprising positioning a sighting means at a predetermined position on the surface of the ground vertically over a point on the path, positioning one point of a light source a predetermined distance below the sighting means on the predetermined path, sighting a marker positioned in a vertical plane including the path with a sighting means, rotating the sighting means around a horizontal axis substantially perpendicular to the vertical plane until a target in the ditch is sighted, projecting a collimated light beam from the light source, adjusting a second end of the light source until the light beam strikes the target as seen through the sighting means, and setting a proper grade on the light source to direct the light beam from the light source along the predetermined path.

Sewer pipeline setting conventionally involves the use of crude instruments and a great deal of human judgment. These pipelines, however, must be accurately positioned. The conventional procedure requires a substantial amount of human effort and time in order to position the pipes.

The present inventor, in U.S. Pat. No. 3,116,557 has disclosed and claimed an improved method of laying sewer pipes and the like involving the use of a properly aligned light source and a target on the end of the pipe. In this new method, the pipe can be laid with great accuracy, a minimum of labor and a minimum of time.

We have now discovered an improved system and method for aligning articles such as sewer pipes using an aligned light source wherein the light source is supported by a frame which can be attached to the inside of a manhole or pipe and a target-sighting means is supported by a device such as a batter board located at the top of the manhole and is adapted to position the sighting means directly over the manhole.

By various aspects of this invention, one or more of the following or other objects can be obtained.

It is an object of this invention to provide an improved apparatus for positioning a light source along a predetermined subterranean path.

It is a further object to provide an improved apparatus for holding a light source in a subterranean cavity.

It is still another object of this invention to provide an improved method for aligning a light source along a predetermined subterranean path.

It is a further object of this invention to provide an improved light-source-supporting device wherein the light source is easily removable and replaceable so that the light beam readjustment is minimized.

Other aspects, objects, and the several advantages of this invention are apparent to one skilled in the art from a study of this disclosure, the drawings, and the appended claims.

The invention will now be described with reference to the accompanying drawings in which:

FIG. 1 is a vertical elevation, partly in section, of a manhole and pipeline trench showing an embodiment of the invention;

FIG. 5 is a perspective front view of the laser supporting device shown in FIG. 4; and FIG. 6 is a perspective view of the light source casing.

Figure 2:
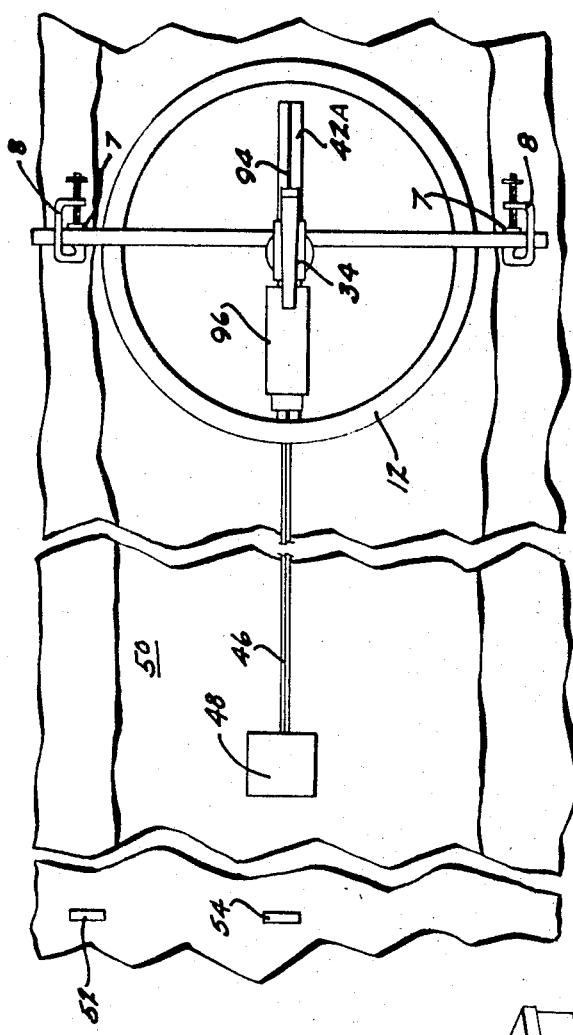
FIG. 2 is a schematic plan view of an area shown in FIG. 1 illustrating the method of aligning the light beam.

Referring now to the drawings, a manhole 2 extending downwardly below the surface of the ground 3 has positioned above it a supporting apparatus such as the batter board assembly 6. Assembly 6 consists of the batter board pins 7, C-clamps, and the batter board 9 extending across the manhole. Mounted on the batter board 9 by means of clamps or bracket 10 is a transit 32. Also mounted on batter board 9 is the tape housing 36 containing the vertical measuring means 38, which is shown as a tape marked with lengths. The measuring tape 38 passes through an adjustable clamp 41, is draped over hook 42, and extends downwardly into the manhole. A two-pronged U-shaped pin 44 is provided to secure parts of the tape 38 on either side of the hook together below the hook 42 to fix the tape at a predetermined length. The hook 42 is supported by a chain which extends downwardly through the center of the transit in a conventional way. The vertical dimension between plumb bob 40 and hook 42 can be adjusted by removing pin 44, loosening clamp 41 and allowing the plumb bob to drop until the desired depth is seen at hook 42 on tape 38. The pin 44 is then replaced to hole the tape 38 at the desired length of hook 42.

A plumb bob 40 is positioned on the bottom of the tape 38 to maintain the same in a vertical position below the top of the manhole. The plumb bob 40 is employed to position at least one point on a light source housing 42A preferably a laser beam 46 in a vertical plane which includes the sighting telescope of transit 34. The light source is attached to a supporting apparatus generally designated as 43 which is attached to the inside of the manhole 2. The light source directs a collimated light beam into a ditch 50 and strikes a target 48 at a distance spaced from the manhole. A device for setting the grade on the light beam is designated by numeral 96.

In operation, it is desired to align the light beam 46 along a predetermined path. Initially transit 34 is positioned above the ground directly over the predetermined path. The position of the transit 34 is determined according to a prior survey. The tape 38 is extended until the bottom point on the plumb bob 40 is positioned at a distance below the ground at which the predetermined path will lie in the center of the manhole. The predetermined path will pass through the center of the manhole and the bottom of plumb bob 40 will be positioned on a point along the predetermined path. The light source housing 42A is then positioned within the manhole on supporting apparatus 43. The supporting apparatus 43 is rigidly attached to the inside of the manhole. The light source housing is adjusted until one point on line 94 on the top of the housing corresponds with the bottom point on plumb bob 40.

The transit 34 is then positioned so that its line of sight lies in a vertical plane which contains the line of the predetermined path. This can be done by sighting on offset stake 52 and measuring over the known distance from the offset stake to the plane of the path or by sighting a permanent stake 54. The offset stakes and the permanent stakes are prepositioned according to a previous survey. In any case, once the transit is set above the ground along the predetermined path, the sighting means of the transit is rotated downwardly in the vertical plane containing the path until target 48 is sighted. The light source is then turned on to project the light beam 46 along the ditch. The front portion of the light source 42A is then adjusted laterally until the light source is projected against target 48 and is centered within the crosshairs seen through the sighting device 34 of the transit. During this adjustment, the back portion of the light source housing 42A must be maintained in contact with the bottom point of plumb bob 40 so that this aligned point does not change. At this time, the light beam 46 will be directed along a line within a vertical plane containing the predetermined path and one point on the predetermined path will intersect the line of light beam 46 (at 40).

The desired grade of the predetermined path is then set on grade box 96 and the front portion of the housing 42A is then adjusted until the light beam is directed along the predetermined path. The device 96 for setting the grade on the light beam is described more fully in my copending application, entitled Grade Setting and Leveling Device, filed concurrently herewith as Ser. No. 704,127, filed Feb. 8, 1968, now U.S. Pat. No. 3,488,854, which application is incorporated herein by reference.

Figure 4:
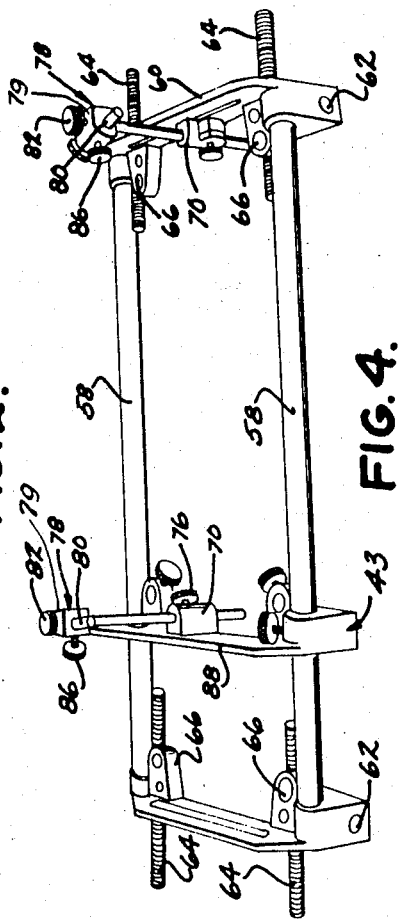
FIG. 4 is a perspective side view of the laser supporting apparatus shown schematically in FIG. 1.
Figure 3:
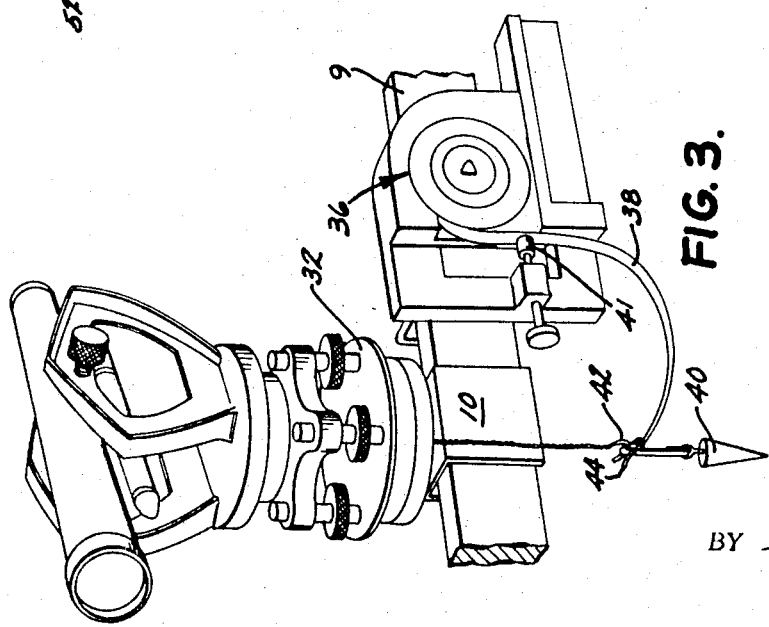
FIG. 3 is a perspective of the transit and vertical measuring means.

The light-beam-supporting apparatus will now be described with reference specifically to FIGS. 4 and 5. The supporting apparatus comprises a pair of longitudinal rails 58 connected to end plates 60. Each end plate is provided with a plurality of holes 62 extending laterally thereof and outwardly at different angles. The holes 62 are threaded to engage threaded rods 64 which support the frame within the manhole by abutting against the walls of the manhole 2. The rods are adjustable within holes 62 and are tightened against the sides of the manhole. The use of the threaded rods and the holes allows the supporting apparatus 44 to be easily secured to any size pipe whether horizontal or vertical. Vertical holes 66 are also provided in the event that it is desired to support the frame in the bottom of the manhole on a horizontal surface.

The front end plate 60 contains a horizontal slot 68. Spaced from front end plate 60 is sliding plate 88 containing a slot 90. Rod adjustment means 70 are provided in slots 68 and 90. These adjustment means 70 are secured to the slots 68 and 90 by pins and bolts 72. The adjustment means 70 slidably support vertical rods 74 which are secured to the adjustment means 70 by adjustable screws 76. Each adjustment means 70 is a collar in which a rod is clamped by a screw 76. Positioned on the top portion of vertical rods 74 are fine adjustment mechanisms 78 which contain horizontal tubes 80 which can be moved by any conventional structure (not shown) in a direction parallel to end plates 60 by turning the screw or adjustment knob 84. Fine vertical adjustments along vertical rods 74 are also provided in the fine adjustment mechanisms 78 by means of a conventional structure (not shown), such adjustment being accomplished by turning of screw or adjustment knob 82. To this end, the inner bore of tubes 80 contains threads which engage the threaded portion of screw 82 which is rotatably mounted in block 79. A clamp is provided in each fine adjustment mechanism to secure the same in a fixed position on rod 70. This clamp is tightened through knob 86. The axis of screw 86 is offset from the axis of screw 82.

The fine adjustment mechanism allows either end of the light source to be finely adjusted independently of the other end. Other fine adjustment means such as cams, can be employed in place of the above-described mechanism.

Referring now specifically to FIG. 6, the laser housing 42A comprises a cylindrical tube having a pair of clamps 92 tightened upon the circular housing by bolts 93. The clamps have outwardly extending pins 95 which fit into tubes 80 on the supporting apparatus. The laser housing has a longitudinal line 94 which is aligned with the collimated beam 46 which emanates from the front portion of the light source housing. The longitudinal line is positioned 90° from the pins 95 so that it will be facing upwardly when the housing 42A is positioned on the supporting apparatus. The line 94 is then used to align the collimated beam in conjunction with plumb bob 40. The point of the plumb bob is positioned on line 94.

With the use of the tubes 80 and pins 95, the light source can be easily positioned on the supporting apparatus and removed as desirable. The pins 95 are held in the tubes 80 by locking screws 81.

The light source, when aligned, is preferably used in laying sewer pipes wherein a target is positioned on the end of each pipe as in the method disclosed and claimed by the present inventor in the above-mentioned U.S. Pat. No. 3,116,557. Once the beam has been aligned, it is desirable to keep the beam in the same position until all the pipes along the predetermined path have been laid. As this process may take more than one day, the problem arises as to whether or not to leave the expensive light source or laser within the manhole. The tubes 80 and pins 95 provide an easy method for removal and replacement of the light source housing, whereby this housing can be replaced in substantially the same position.

The supporting apparatus 43 can also be positioned in a horizontally extending pipe spur or pipeline. The vertical and horizontal holes in the end plates 60 provide a means for positioning the supporting apparatus and the light source within the pipeline for either completing the spur, or for checking the alignment of the pipeline. In this case, the light beam would be aligned by setting the housing in a predetermined relationship in the pipeline and using a target in the end pipe in the pipeline.

With the light source housing 42A supported by mechanism 78, the supporting apparatus provides for means to roughly adjust the position of the light source (adjustment means 70, slots 68 and 90) and for finely adjusting the position of the light source (mechanism 78). Further, it will be appreciated that either end can be roughly or finely adjusted independent of the other end. This independent adjustment allows the light beam to be rapidly and accurately adjusted to the desired position. With the apparatus and methods described herein, it has been found that the light beam can be adjusted to the desired position with great accuracy.

It will be appreciated from the foregoing that the collimated light beam can be accurately aligned and maintained in alignment with the above-described apparatus. The affixing of the transit and the light-source-supporting housing to the manhole assures that these components will not cause errors in the aligning of the light beam, and in maintaining the aligned position of the light beam with the use of the plumb bob. The use of gravity through the plumb bob ensures that the line of the light beam passes through a point directly below the sighting means. As is appreciated by one skilled in the art, an error of a fraction of an inch in aligning the direction of the light beam can result in a 10-foot error in the placement of the sewer pipes at the end of a 300-foot sewer pipeline. Therefore, the use of instruments which assure extreme accuracy is essential to the laying of sewer pipes with a collimated light beam. In prior art systems wherein the sighting means or transit was not fixed to the top of the ground such as through a manhole, and/or wherein the collimated light source was not affixed to the bottom of the manhole, and/or wherein a plumb bob means was not employed in positioning the collimated light beam directly below the transit, the collimated light beam could not be aligned and/or maintained aligned with sufficient consistency and accuracy to make practical laying sewer pipes with the use of a collimated light beam.

Reasonable variation and modification are possible within the scope of the foregoing disclosure, the drawings, and the appended claims of the invention without departing from the spirit thereof.

The embodiments of the invention in which I claim an exclusive property or privilege are defined as follows.

1. An apparatus for laying sewer pipes and the like comprising:
  A. a sighting means;
  B. a sighting means support apparatus;
    1. means for securing a sighting means to said support apparatus;
    2. vertical plumbing means attached to said sighting means and extending vertically downward therefrom;
  C. means for supporting a collimated light source within a manhole;
  D. a collimated light source including a housing supported on said means for supporting a collimated light source and said housing having means cooperating with said vertical plumbing means to align the collimated light beam of said light source with the vertical plane of the line of sight of said sighting means;
  E. grade-setting means attached to said light source housing.

2. An apparatus according to claim 1 wherein said light source comprises a laser-beam-generating means having a longitudinal housing and aligning means extending longitudinally along said housing and aligned with the line of said laser beam.

3. An apparatus according to claim 1 wherein said light source is a laser beam.

4. The device of claim 1 in which the means for supporting the collimated light source is at least a two-point support.

5. An apparatus according to claim 1 wherein said vertical plumbing means comprises a tape measure with a means to fix the position of said tape measure at a predetermined length.

6. An apparatus according to claim 5 wherein said plumbing means comprises a plumb bob at the end of said tape measure for positioning the tape measure substantially vertical.

7. An apparatus according to claim 1 wherein said light-source-supporting means of (C) comprises a frame having end plates connected by at least two rail members therebetween, and said end plates are provided with means to support said frame between the walls of a pipe.

8. An apparatus according to claim 7 wherein said frame-supporting means comprises apertures in said end plates and pins threadably engaged therein and extending laterally therefrom.

9. An apparatus according to claim 8 wherein each end plate contains a plurality of holes extending in a plurality of directions for threadably engaging said pins.

10. An apparatus according to claim 7 wherein at least one of said end plates contains a laterally extending track means having a supporting rod attached to said end plate and slidable in said track means; said supporting means of (C) further comprises: means for attaching said rod to said plate in said track means; means for slidably engaging said rod such that the rod can be moved upwardly and downwardly with respect to said end plate; clamping means to clamp said rod in said rod-engaging means; and clamping means for clamping said rod-attaching means in a predetermined position in said track means.

11. An apparatus according to claim 10 wherein said supporting rod has slidably attached thereto a support adjustment means having an outwardly extending tube for supporting a laser beam housing, the support adjustment means comprising; means for finely adjusting said support adjustment means vertically with respect to the supporting rod; means for finely adjusting the support adjustment means horizontally with respect to said rod, and a means for clamping said horizontal and vertical fine adjusting means relative to said supporting rod.

12. AN apparatus according to claim 11 wherein said light source comprises a laser-beam-generating means and a longitudinal housing having a longitudinal alignment means along said housing aligned with the direction of said laser beam, said housing having exterior clamps with pins extending laterally of said housing adapted to be positioned on the outwardly extending tubes on the support adjustment means on said supporting rod of said beam-supporting apparatus.

13. An apparatus according to claim 12 wherein said light-source-supporting means comprises a plate positioned between said rail members and slidable on said rail members, said plate containing a laterally extending track, a rod-supporting means positioned in said track and slidable therein, a rod slidably attached to said rod-supporting means so that said rod can be moved upwardly and downwardly with respect to said plate, and further comprising means to clamp said rod in said rod-engaging means, and means for clamping said rod-attaching means in a predetermined position in said laterally extending track.

14. A method for aligning a light beam along a predetermined subterranean path from a vertical hole in the ground intersecting said path wherein a subterranean ditch is provided generally along said path from said vertical hole, said method comprising:
A. positioning a sighting means at a predetermined position on the surface of the ground vertically over a point on said path;
B. positioning one point of a light source a predetermined distance below said sighting means on said predetermined path;
C. sighting a marker with said sighting means in a vertical plane including said path, rotating said sighting means around a horizontal axis perpendicular to said vertical plane until a target in said ditch is sighted;
D. projecting a light beam from said light source;
E. adjusting a second point of said light source until said light beam strikes said target as seen through said sighting means; and
F. setting a proper grade on said light source to position said light source along said path.

15. A method according to claim 14 wherein said sighting means is provided with reference indicia and said light beam is adjusted to strike said target so as to correspond with said reference indicia seen through said sighting means.

16. A method of aligning a light beam according to claim 14 wherein said sighting means is positioned over a preplaced manhole at a predetermined distance from an offset stake.